C. A. MORRIS.
EXCAVATING SHOVEL.
APPLICATION FILED JULY 20, 1911.
1,022,638.
Patented Apr. 9, 1912.
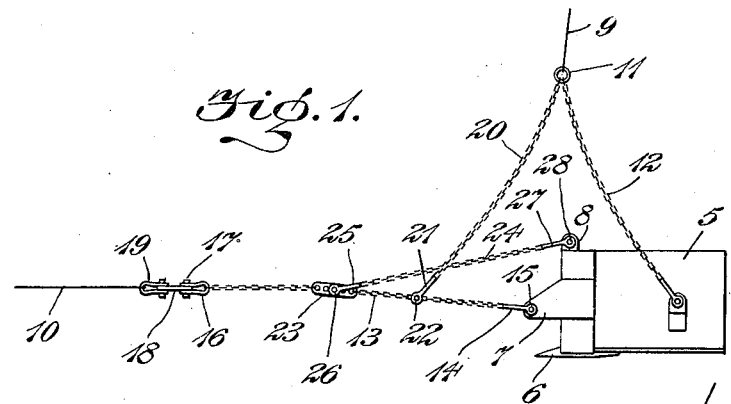
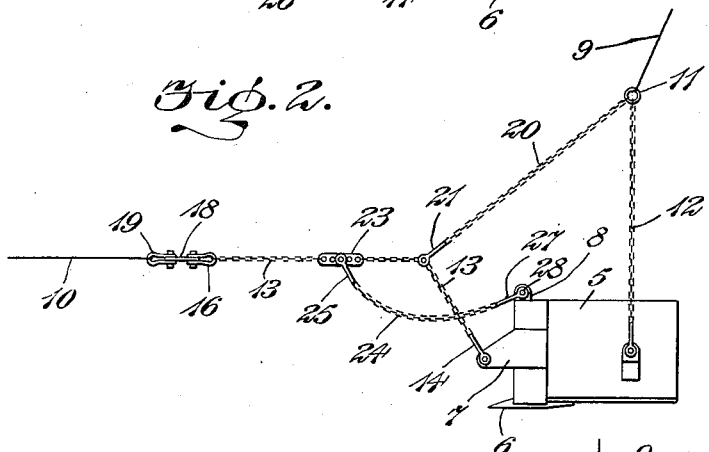
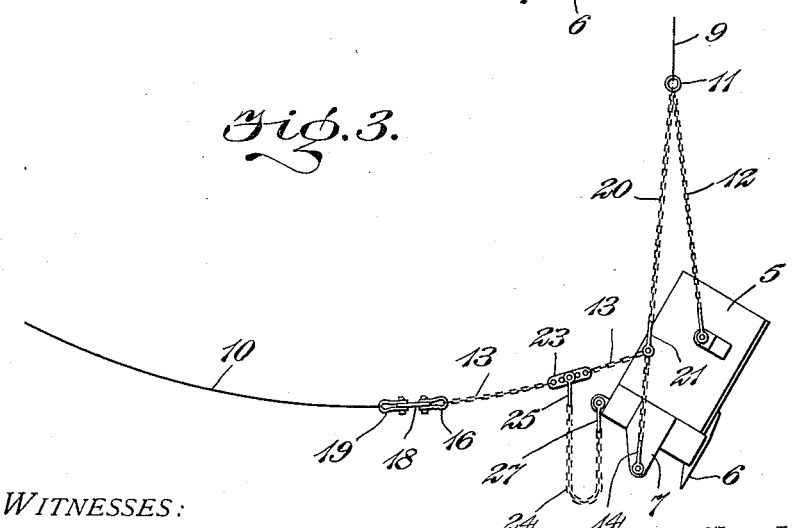
WITNESSES:
W. C. Abbott
J. P. Mothershead
INVENTOR
Charles A. Morris
BY Griffins Bernhard
Attorneys

UNITED STATES PATENT OFFICE.

CHARLES A. MORRIS, OF MONTCLAIR, NEW JERSEY, ASSIGNOR TO THE HAYWARD COMPANY, A CORPORATION OF NEW YORK.

EXCAVATING-SHOVEL.

1,022,638. Specification of Letters Patent. Patented Apr. 9, 1912.

Application filed July 20, 1911. Serial No. 639,533.

*To all whom it may concern:*

Be it known that I, CHARLES A. MORRIS, a citizen of the United States, residing in Montclair, county of Essex, and State of New Jersey, have invented a certain new and useful Excavating-Shovel, of which the following is a specification.

This invention is an excavating shovel of simple construction, wherein the several operations of loading, hoisting and dumping are effected by maintaining or slackening tension on the haul rope and the fall rope.

In a practical embodiment of the invention, the shovel is provided with a suspending bridle and a draft bridle, to which are connected the fall rope and the haul rope respectively. A controlling bridle is connected to the fall rope or the suspending bridle and to the draft bridle, the operative length of said controlling bridle being such as to preclude the shovel from tilting to a dumping position when said shovel is hoisted and tension is maintained on the fall rope and the haul rope.

The invention embodies, also, means for adjusting the angle of presentation of the shovel to the soil, for the purpose of regulating the depth of the cut. To secure this result, the draft bridle is connected to the shovel at its forward end, and an adjusting bridle is attached to the shovel above the connection of the draft bridle thereto, said adjusting bridle being attached adjustably to the draft bridle. In the operation of loading the shovel, the pull of the haul cable is transmitted through the draft bridle and the adjusting bridle so that the latter bridle operates to pull upon the upper part of the shovel in a manner to tilt it to the proper inclination. By shifting the adjusting bridle relative to the draft bridle, the pull of the adjusting bridle may be so changed as to result in a variation in the angular position of the shovel, and thus the depth of the cut by the shovel is regulated.

Other features of the invention and the advantages thereof will appear in the course of the annexed detailed description.

In the accompanying drawings, I have illustrated one practical embodiment of the invention, but the construction shown therein is to be understood as illustrative, only, and not as defining the limits of the invention.

Figure 1 is a side elevation illustrating the shovel in a loading position. Fig. 2 is a similar view with the shovel in a hoisted conveying position. Fig. 3 is a similar view illustrating the shovel in a dumping position.

5 designates a shovel which is of any usual or preferred construction. Said shovel is closed at its bottom and rear, but it is open at the front and top. At the lower front edge of the bottom, the shovel is provided with digging toes 6, and at said front end, said shovel is provided, also, with draft lugs 7 and upstanding ears 8, said draft lugs being intermediate the height of the shovel, and the upstanding ears being positioned above the draft lugs.

9 is the fall rope and 10 is the haul rope. Said fall rope is shown as having an eye 11 to which is attached a suspending bridle 12. Said bridle is composed of two members which meet at, and are connected to, ring 11 of the fall rope, but the lower ends of the members composing the bridle are loosely or pivotally connected to the respective sides of the shovel, preferably at points rearwardly of the center of gravity thereof, substantially as shown in the drawings.

Between the shovel and the haul cable is a draft bridle 13 composed of forwardly converging members, the rear ends of said members being provided with shackles 14 which are pivotally connected at 15 to the draft lugs 7 of the shovel. The forward ends of the converging members composing the draft bridle are connected to a shackle 16, the latter being pivoted at 17 to a draft plate 18. Said draft plate is preferably triangular in form, substantially as disclosed in a prior application filed by me on April 8, 1911, Serial No. 619,646, in order that the position of the draft plate relative to the haul cable and the draft bridle may be shifted for the purpose of changing the line of draft on the shovel. Said draft plate 18 is pivotally connected to a shackle 19 of the haul rope.

For the purpose of precluding tilting of the shovel to a dumping position under the weight of the load in said shovel, I employ a controlling bridle 20 which coöperates with the fall rope of the suspending bridle and with the draft bridle. Said controlling bridle is composed of downwardly converging members, the upper ends of which are loosely connected to ring 11. The lower ends of the members composing the controlling bridle are provided with shackles 21, and these shackles are connected by bolts 22 with the respective members of draft bridle 13. The controlling bridle is connected at its lower end to the draft bridle forwardly of the connection of said bridle with the shovel, and the operative length of controlling bridle 20 is such that, when the shovel is hoisted, suspended and conveyed, the line of pull of haul cable 10 and draft bridle 13 is changed, as shown in Fig. 2, whereby the controlling bridle operates to support the forward part of the shovel in a manner to preclude the shovel from tilting to a dumping position. The employment of shackles 21 and bolts 22 allows the lower end of controlling bridle 20 to be shifted relative to the draft bridle.

The members of draft bridle 13 are provided with perforated plates 23, said plates being positioned intermediate shackles 14, 16 of said draft bridle, and preferably adjacent shackles 16. An adjusting bridle 24 is provided at the forward end of each member thereof with a shackle 25, each being connected by a bolt 26 to one perforated plate 23. The adjusting bridle is provided at the rear of its members with shackles 27 which are loosely connected by bolts 28 to the upstanding ears 8 at the forward upper part of the shovel. It is thus apparent that the adjusting bridle is connected at its rear to the shovel above the attachment of the draft bridle 13 to said shovel, whereas the forward part of adjusting bridle 24 is connected to the draft bridle intermediate the ends thereof. The adjusting bridle is shiftable relative to the draft bridle by moving the bolt 26 into one or the other of the apertures of plate 23, and thus the pull of the adjusting bridle 24 upon the shovel may be changed for the purpose of varying the inclination of the shovel so as to regulate the depth of cut into the soil.

The operation is as follows:—The shovel is lowered into contact with the ground by slackening upon the fall rope, bridles 12 and 20 being scackened as in Fig. 1 during the operation of loading the shovel. The shovel is drawn in a forward direction by tension on haul rope 10, the strain of which is transmitted to the shovel through draft bridle 15 and adjusting bridle 21. Said adjusting bridle is so related to the draft bridle and the shovel that the strain of the haul rope thereon will tilt the shovel into a forwardly and downwardly inclined position, thus causing the toes 6 to dig into the soil.

During the forward movement of the shovel under the strain of the haul rope, the fall rope 9 and bridles 12 and 20 remain slack, but the shovel having been loaded in the manner described, the next step is to hoist the shovel. The elevation of the shovel is effected by placing tension upon the fall rope while keeping tension upon haul rope 10, the effect of which is to suspend the loaded shovel from the fall rope by bridle 12. In this connection it is to be noted, however, that when tension is applied to fall rope 9 and haul rope 10, the weight of the shovel causes it to hang from suspending bridle 12, but the shovel is prevented from tilting to a downwardly inclined position by the action of controlling bridle 20, the pull of which on draft bridle 13 and haul rope 10 changes the relation of said draft bridle and the haul rope to the shovel, substantially as shown in Fig. 2, said figure representing the shovel in a suspended position. The controlling bridle 20, in connection with the draft bridle and the haul rope, supports the front end portion of the shovel in such a manner that the shovel cannot tilt so long as tension is maintained upon the haul rope. The shovel in a suspended nondumping position may now be moved to a place over which it is desired to deposit the load, at which time tension on haul rope 10 is slackened, whereupon the shovel is permitted to turn into the inclined position of Fig. 3. It is evident that the shovel will be suspended from the fall rope by bridle 12 and by bridle 20 in connection with a part of the draft bridle 13, bridle 24 and the haul rope being slack as shown in Fig. 3. When the load is discharged from the shovel, the empty shovel is returned to the place from which the material is to be excavated, after which said empty shovel is dropped upon the ground by slackening fall rope 9, and the operation of loading the shovel is resumed by placing tension upon haul cable 10.

From the foregoing description taken in connection with the drawings, it is apparent that the shovel is controlled by the bridles and by maintaining tension upon fall rope 9 and haul rope 10, thereby slackening said fall rope and haul rope as required. My apparatus does not employ any means, such as triggers or latches, for locking a loaded shovel in a nondumping position during the operation of hoisting and conveying the material, but on the contrary, said shovel is retained in a nondumping position by maintaining tension upon the haul rope, whereupon the controlling bridle operates in connection with the draft bridle to retain the shovel in the desired nondumping position. It is preferred to employ flexible bridles, composed preferably of chains, for the reason that bridles of this nature will yield or give according to the work which they are to do in connection with the shovel, but it is not desired to limit the invention strictly to bridles composed of chains.

Having thus fully described the invention, what I claim as new, and desire to secure by Letters Patent is:—

1. In a device of the class described, a shovel, a fall rope, a haul rope, and a controlling member coöperating directly with the fall rope and the haul rope, said controlling member being free from connection with the shovel and operating to support the forward end of the shovel and to preclude said shovel from dumping when tension is maintained on said ropes.

2. In a device of the class described, a shovel, a suspending bridle, a draft bridle, and a controlling member coöperating directly with the draft bridle and the suspending bridle, said controlling member being free from connection with the shovel, the operative length of said controlling member being such that, when tension is maintained on the bridles, the forward part of the shovel is supported by the controlling member and said shovel is thereby precluded from tilting to a dumping position.

3. In a device of the class described, a shovel, a suspending bridle therefor, a draft bridle attached to the forward part of the shovel, and a controlling bridle free from connection with the shovel but connected to the draft bridle forwardly of the attachment of said bridle to the shovel, said controlling member operating when tension is maintained on the draft bridle to support the forward part of the shovel and thereby retain said shovel in a nondumping position.

4. In a device of the class described, a shovel, a fall rope, a suspending bridle connected to the shovel rearwardly of the center of gravity thereof, a haul rope, a draft bridle connected to said shovel, and a controlling bridle, free from connection with the shovel, connected to the suspending bridle and attached to the draft bridle forwardly of attachment of the latter bridle to said shovel, said controlling member operating, when tension is maintained on the haul rope and the fall rope, to support the forward part of the shovel and to thereby retain the shovel in a non-dumping position.

5. In a device of the class described, a shovel, a suspending bridle attached to the shovel rearwardly of the center of gravity thereof, a draft bridle attached to the shovel, and a controlling bridle separate from said shovel and attached to the suspending bridle and the draft bridle, the operative length of said controlling bridle being such that, when the shovel is hoisted, the said controlling bridle will exert tension upon the draft bridle to change the line of pull thereof upon the forward part of the shovel.

6. In a device of the class described, a shovel, a suspending bridle therefor, a flexible draft bridle, a haul rope connected with the draft bridle, and a flexible controlling bridle attached to the draft bridle and intermediate the ends thereof so that when the shovel is being conveyed the line of pull on the haul rope, owing to the angular form assumed by the draft bridle, is automatically shifted to a position substantially above the point of attachment of said draft bridle to the shovel.

7. In a device of the class described, a shovel, means for suspending it, a haul rope, and a plurality of draft bridles fixedly and directly attached to the shovel and the haul rope, one of said bridles being adjustable at its forward portion relative to the corresponding portion of the other bridle, whereby the angle of inclination of the shovel may be varied.

8. In a device of the class described, a shovel, suspension means therefor, a haul rope, a plurality of draft bridles connected at points one above the other to the forward part of the shovel, and adjustable means connecting the forward portions of said bridles with the haul rope, whereby one of said bridles is adjustable relative to the other for the purpose of changing the angle of inclination of said shovel.

9. In a device of the class described, a shovel, suspension means therefor, a haul rope, a draft bridle connected to the forward part of the shovel, and a second draft bridle attached to the shovel above the first named bridle, said second draft bridle being adjustably connected to the first bridle.

10. In a device of the class described, a shovel, suspension means therefor, two draft bridles fixedly attached to the shovel, a haul rope coöperating with said draft bridles, and a controlling bridle connecting the suspension means and one of said draft bridles, said controlling bridle being free from connection with the shovel.

11. In a device of the class described, a shovel, a suspending bridle therefor, a flexible draft bridle therefor, and a flexible controlling bridle free from connection with the shovel and having its ends connected with the draft bridle and suspending bridle respectively.

12. In a device of the class described, a shovel, a suspending bridle connected to the shovel rearwardly of the center of gravity thereof, a draft bridle attached to the shovel at the forward part thereof, and controlling mechanism free from connection with the shovel, said controlling mechanism coöperating with the suspending bridle and the draft bridle to support the forward end of the shovel, thereby overcoming the tendency of the shovel to tilt into a dumping position.

In testimony whereof I have signed my name to this specification in the presence of two subscribing witnesses.

CHARLES A. MORRIS.

Witnesses:
H. I. BERNHARD,
J. F. MATHERSHEAD.

Copies of this patent may be obtained for five cents each, by addressing the "Commissioner of Patents. Washington, D. C."